US009280717B2

United States Patent
Polo (10) Patent No.: US 9,280,717 B2
(45) Date of Patent: Mar. 8, 2016

(54) OPERATING A COMPUTING DEVICE BY DETECTING ROUNDED OBJECTS IN AN IMAGE

(71) Applicant: Orbotix, Inc., Boulder, CO (US)

(72) Inventor: Fabrizio Polo, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 333 days.

(21) Appl. No.: 13/894,247

(22) Filed: May 14, 2013

(65) Prior Publication Data

US 2013/0301879 A1 Nov. 14, 2013

Related U.S. Application Data

(60) Provisional application No. 61/646,716, filed on May 14, 2012.

(51) Int. Cl.
*G06K 9/32* (2006.01)
*G06T 7/20* (2006.01)
*G06T 7/00* (2006.01)

(52) U.S. Cl.
CPC ............ *G06K 9/3241* (2013.01); *G06T 7/2033* (2013.01); *G06T 7/2066* (2013.01); *G06T 7/0077* (2013.01); *G06T 7/0083* (2013.01)

(58) Field of Classification Search
CPC .. G06K 9/3241; G06T 7/2033; G06T 7/2066; G06T 7/0083; G06T 7/0077
See application file for complete search history.

(56) References Cited

U.S. PATENT DOCUMENTS

| | | | |
|---|---|---|---|
| 3,683,216 A | 8/1972 | Post | |
| 4,996,468 A | 2/1991 | Field et al. | |
| 5,297,981 A | 3/1994 | Maxim et al. | |
| 5,342,051 A * | 8/1994 | Rankin et al. | 473/199 |
| 5,413,345 A * | 5/1995 | Nauck | 473/156 |
| 5,489,099 A * | 2/1996 | Rankin et al. | 473/199 |
| 5,513,854 A * | 5/1996 | Daver | 700/91 |
| 5,644,139 A * | 7/1997 | Allen et al. | 250/557 |
| 5,780,826 A * | 7/1998 | Hareyama et al. | 235/385 |

(Continued)

FOREIGN PATENT DOCUMENTS

| | | |
|---|---|---|
| DE | 101 46 862 A1 | 5/2002 |
| JP | 03182290 A | 8/1991 |

(Continued)

OTHER PUBLICATIONS

Notification of Transmittal of International Search Report and The Written Opinion of The International Searching Authority mailed Oct. 15, 2013, for related PCT Application No. PCT/US2013/050327 filed Jul. 12, 2013, 13 pages.

(Continued)

*Primary Examiner* — Manav Seth
(74) *Attorney, Agent, or Firm* — Mahamedi Paradice LLP (57) ABSTRACT

A method is disclosed for operating a computing device. One or more images of a scene captured by an image capturing device of the computing device is processed. The scene includes an object of interest that is in motion and that has a rounded shape. The one or more images are processed by detecting a rounded object that corresponds to the object of interest. Position information is determined based on a relative position of the rounded object in the one or more images. One or more processes are implemented that utilize the position information determined from the relative position of the rounded object.

16 Claims, 4 Drawing Sheets

(56) References Cited

U.S. PATENT DOCUMENTS

| | | | |
|---|---|---|---|
| 5,953,056 A * | 9/1999 | Tucker | 348/157 |
| 6,227,933 B1 | 5/2001 | Michaud et al. | |
| 6,246,927 B1 | 6/2001 | Dratman | |
| 6,449,010 B1 * | 9/2002 | Tucker | 348/157 |
| 6,456,938 B1 * | 9/2002 | Barnard | 701/454 |
| 6,458,008 B1 | 10/2002 | Hyneman | |
| 6,459,955 B1 | 10/2002 | Bartsch et al. | |
| 6,573,883 B1 | 6/2003 | Bartlett | |
| 6,615,109 B1 | 9/2003 | Matsuoka et al. | |
| 6,764,373 B1 | 7/2004 | Osawa et al. | |
| 6,785,590 B2 | 8/2004 | Kasuga et al. | |
| 6,856,696 B1 * | 2/2005 | Ajioka | 382/173 |
| 6,901,110 B1 * | 5/2005 | Tsougarakis et al. | 375/240.12 |
| 6,945,843 B1 | 9/2005 | Motosko | |
| 6,980,956 B1 | 12/2005 | Takagi et al. | |
| 7,058,205 B2 * | 6/2006 | Jepson et al. | 382/103 |
| 7,069,113 B2 | 6/2006 | Matsuoka et al. | |
| 7,170,047 B2 | 1/2007 | Pal | |
| 7,173,604 B2 | 2/2007 | Marvit et al. | |
| 7,258,591 B2 | 8/2007 | Xu et al. | |
| 7,283,647 B2 * | 10/2007 | McNitt | 382/107 |
| 7,292,711 B2 * | 11/2007 | Kiraly et al. | 382/103 |
| 7,324,663 B2 * | 1/2008 | Kiraly | 382/103 |
| 7,328,671 B2 * | 2/2008 | Kates | 119/720 |
| 7,340,077 B2 | 3/2008 | Gokturk et al. | |
| 7,340,344 B2 * | 3/2008 | Chappell | 701/500 |
| 7,344,430 B2 | 3/2008 | Hasty et al. | |
| 7,409,924 B2 * | 8/2008 | Kates | 119/720 |
| 7,424,867 B2 * | 9/2008 | Kates | 119/720 |
| 7,432,718 B2 | 10/2008 | Ishihara et al. | |
| 7,526,362 B2 | 4/2009 | Kim et al. | |
| 7,542,597 B2 * | 6/2009 | Rahn et al. | 382/133 |
| 7,639,874 B2 * | 12/2009 | Bushell et al. | 382/173 |
| 7,699,683 B2 * | 4/2010 | Caspi | 446/456 |
| 7,702,131 B2 * | 4/2010 | Chinen et al. | 382/103 |
| 7,714,880 B2 | 5/2010 | Johnson | |
| 7,755,660 B2 * | 7/2010 | Nejikovsky et al. | 348/143 |
| 7,822,507 B2 | 10/2010 | Ishihara et al. | |
| 7,847,504 B2 | 12/2010 | Hollis | |
| 7,853,357 B2 | 12/2010 | Sawada et al. | |
| 7,899,226 B2 * | 3/2011 | Pescatore et al. | 382/128 |
| 7,979,162 B2 | 7/2011 | Niemela et al. | |
| 8,025,551 B2 | 9/2011 | Torres et al. | |
| 8,038,504 B1 | 10/2011 | Wong | |
| 8,077,981 B2 * | 12/2011 | Elangovan et al. | 382/209 |
| 8,099,189 B2 | 1/2012 | Kaznov et al. | |
| 8,128,450 B2 | 3/2012 | Imai | |
| 8,128,500 B1 | 3/2012 | Borst et al. | |
| 8,142,287 B2 | 3/2012 | Podoloff | |
| 8,144,118 B2 * | 3/2012 | Hildreth | 345/156 |
| 8,180,436 B2 | 5/2012 | Boyden et al. | |
| 8,197,298 B2 | 6/2012 | Willett | |
| 8,258,917 B2 | 9/2012 | Cai et al. | |
| 8,274,406 B2 | 9/2012 | Karlsson et al. | |
| 8,275,544 B1 | 9/2012 | Wells et al. | |
| 8,326,469 B2 | 12/2012 | Phillips et al. | |
| 8,352,643 B2 | 1/2013 | Birnbaum et al. | |
| 8,355,818 B2 | 1/2013 | Nielsen et al. | |
| 8,364,136 B2 | 1/2013 | Hoffberg et al. | |
| 8,392,065 B2 | 3/2013 | Tolstedt et al. | |
| 8,396,611 B2 | 3/2013 | Phillips et al. | |
| 8,400,619 B1 * | 3/2013 | Bachrach et al. | 356/4.01 |
| 8,417,384 B2 | 4/2013 | Togawa et al. | |
| 8,456,298 B2 | 6/2013 | Valtonen | |
| 8,571,781 B2 * | 10/2013 | Bernstein et al. | 701/99 |
| 8,577,595 B2 | 11/2013 | Zhao et al. | |
| 8,670,889 B2 | 3/2014 | Kaznov | |
| 8,751,063 B2 * | 6/2014 | Bernstein et al. | 701/2 |
| 8,766,983 B2 | 7/2014 | Marks et al. | |
| 8,885,882 B1 * | 11/2014 | Yin et al. | 382/103 |
| 2003/0093182 A1 | 5/2003 | Yokoyama | |
| 2004/0002843 A1 | 1/2004 | Robarts et al. | |
| 2004/0182614 A1 | 9/2004 | Wakui | |
| 2004/0186623 A1 | 9/2004 | Dooley et al. | |
| 2005/0186884 A1 | 8/2005 | Evans | |
| 2005/0226192 A1 | 10/2005 | Red et al. | |
| 2005/0264472 A1 | 12/2005 | Rast | |
| 2006/0080802 A1 * | 4/2006 | Tani | 15/319 |
| 2006/0095158 A1 | 5/2006 | Lee et al. | |
| 2006/0101465 A1 | 5/2006 | Kato et al. | |
| 2006/0132318 A1 * | 6/2006 | Shimizu | 340/575 |
| 2006/0271251 A1 | 11/2006 | Hopkins | |
| 2007/0112462 A1 | 5/2007 | Kim et al. | |
| 2007/0249422 A1 | 10/2007 | Podoloff | |
| 2007/0259592 A1 | 11/2007 | Imai et al. | |
| 2008/0033641 A1 | 2/2008 | Medalia | |
| 2008/0174268 A1 | 7/2008 | Koo et al. | |
| 2008/0240507 A1 | 10/2008 | Niwa et al. | |
| 2008/0263628 A1 | 10/2008 | Norman et al. | |
| 2008/0267450 A1 | 10/2008 | Sugimoto et al. | |
| 2008/0269949 A1 | 10/2008 | Norman et al. | |
| 2009/0055019 A1 | 2/2009 | Stiehl et al. | |
| 2009/0057238 A1 | 3/2009 | Garti | |
| 2009/0081923 A1 | 3/2009 | Dooley et al. | |
| 2009/0204261 A1 | 8/2009 | Strand et al. | |
| 2009/0226035 A1 | 9/2009 | Iihoshi et al. | |
| 2009/0262074 A1 | 10/2009 | Nasiri et al. | |
| 2009/0284553 A1 * | 11/2009 | Seydoux | 345/649 |
| 2009/0316012 A1 * | 12/2009 | Matos | 348/208.14 |
| 2010/0002909 A1 | 1/2010 | Lefevre et al. | |
| 2010/0010669 A1 | 1/2010 | Lee et al. | |
| 2010/0032224 A1 | 2/2010 | Liu | |
| 2010/0063652 A1 | 3/2010 | Anderson | |
| 2010/0066676 A1 | 3/2010 | Kramer et al. | |
| 2010/0090661 A1 | 4/2010 | Chen et al. | |
| 2010/0106344 A1 | 4/2010 | Edwards et al. | |
| 2010/0145236 A1 | 6/2010 | Greenberg et al. | |
| 2010/0169098 A1 | 7/2010 | Patch | |
| 2010/0172287 A1 | 7/2010 | Krieter | |
| 2010/0178982 A1 * | 7/2010 | Ehrman | 463/37 |
| 2010/0183195 A1 | 7/2010 | Sharma | |
| 2010/0234993 A1 | 9/2010 | Seelinger et al. | |
| 2010/0241289 A1 | 9/2010 | Sandberg | |
| 2010/0261526 A1 | 10/2010 | Anderson et al. | |
| 2010/0283988 A1 * | 11/2010 | Mosier et al. | 356/4.01 |
| 2010/0305778 A1 | 12/2010 | Dorneich et al. | |
| 2010/0305781 A1 | 12/2010 | Felix | |
| 2010/0324753 A1 | 12/2010 | Okumatsu | |
| 2011/0003640 A9 | 1/2011 | Ehrman | |
| 2011/0018731 A1 | 1/2011 | Linsky et al. | |
| 2011/0018794 A1 | 1/2011 | Linsky et al. | |
| 2011/0022196 A1 | 1/2011 | Linsky et al. | |
| 2011/0050940 A1 | 3/2011 | Lanz et al. | |
| 2011/0060492 A1 | 3/2011 | Kaznov | |
| 2011/0065488 A1 | 3/2011 | Okamura et al. | |
| 2011/0071652 A1 | 3/2011 | Brown et al. | |
| 2011/0071702 A1 | 3/2011 | Wang et al. | |
| 2011/0082566 A1 | 4/2011 | Herr et al. | |
| 2011/0087371 A1 | 4/2011 | Sandberg et al. | |
| 2011/0138416 A1 | 6/2011 | Kang et al. | |
| 2011/0183732 A1 | 7/2011 | Block et al. | |
| 2011/0184590 A1 | 7/2011 | Duggan et al. | |
| 2011/0201362 A1 | 8/2011 | Bregman-Amitai et al. | |
| 2011/0213278 A1 | 9/2011 | Horak et al. | |
| 2011/0234488 A1 | 9/2011 | Ge et al. | |
| 2011/0237324 A1 | 9/2011 | Clavin et al. | |
| 2011/0250967 A1 | 10/2011 | Kulas | |
| 2011/0283223 A1 | 11/2011 | Vaittinen et al. | |
| 2011/0286631 A1 * | 11/2011 | Wagner et al. | 382/103 |
| 2011/0291926 A1 | 12/2011 | Gokturk et al. | |
| 2011/0313568 A1 | 12/2011 | Blackwell et al. | |
| 2011/0320830 A1 | 12/2011 | Ito | |
| 2012/0009845 A1 * | 1/2012 | Schmelzer | 446/431 |
| 2012/0035799 A1 | 2/2012 | Ehrmann | |
| 2012/0065747 A1 | 3/2012 | Brown et al. | |
| 2012/0083945 A1 | 4/2012 | Oakley et al. | |
| 2012/0099756 A1 | 4/2012 | Sherman et al. | |
| 2012/0100915 A1 | 4/2012 | Margalit et al. | |
| 2012/0106783 A1 | 5/2012 | Chang et al. | |
| 2012/0146775 A1 | 6/2012 | Kudo et al. | |
| 2012/0167014 A1 | 6/2012 | Joo et al. | |
| 2012/0168241 A1 * | 7/2012 | Bernstein et al. | 180/167 |
| 2012/0173018 A1 | 7/2012 | Allen et al. | |
| 2012/0173047 A1 | 7/2012 | Bernstein et al. | |

(56) References Cited

U.S. PATENT DOCUMENTS

| | | | |
|---|---|---|---|
| 2012/0173049 | A1 | 7/2012 | Bernstein et al. |
| 2012/0185115 | A1 | 7/2012 | Dean |
| 2012/0193154 | A1 | 8/2012 | Wellborn et al. |
| 2012/0197439 | A1 | 8/2012 | Wang et al. |
| 2012/0215355 | A1 | 8/2012 | Bewley et al. |
| 2012/0229647 | A1 | 9/2012 | Calman et al. |
| 2012/0232977 | A1 | 9/2012 | Calman et al. |
| 2012/0233015 | A1 | 9/2012 | Calman et al. |
| 2012/0240077 | A1 | 9/2012 | Vaittinen et al. |
| 2012/0263154 | A1 | 10/2012 | Blanchflower et al. |
| 2012/0291926 | A1 | 11/2012 | Misra et al. |
| 2012/0293548 | A1 | 11/2012 | Perez et al. |
| 2012/0298049 | A1 | 11/2012 | Cook et al. |
| 2012/0298430 | A1 | 11/2012 | Schroll et al. |
| 2012/0307001 | A1 | 12/2012 | Osako et al. |
| 2012/0311810 | A1 | 12/2012 | Gilbert et al. |
| 2013/0050069 | A1 | 2/2013 | Ota |
| 2013/0065482 | A1 | 3/2013 | Trickett |
| 2013/0109272 | A1 | 5/2013 | Rindlisbacher |
| 2013/0143482 | A1 | 6/2013 | Regier |
| 2013/0173089 | A1* | 7/2013 | Bernstein et al. ............. 701/2 |
| 2013/0293584 | A1 | 11/2013 | Anderson |
| 2013/0307875 | A1 | 11/2013 | Anderson |
| 2014/0120887 | A1 | 5/2014 | Huang |

FOREIGN PATENT DOCUMENTS

| | | | |
|---|---|---|---|
| JP | 09254838 | A | 9/1997 |
| JP | 2000218578 | A | 8/2000 |
| JP | 2008-040725 | A | 2/2008 |
| KR | 10-2008-040725 | A | 8/2008 |
| KR | 10-2008-0073626 | A | 8/2008 |
| KR | 10-2008-0092595 | A | 10/2008 |
| KR | 10-2009-0000013 | A | 1/2009 |
| KR | 10-0969873 | B1 | 7/2010 |
| WO | WO-97/25239 | A1 | 7/1991 |
| WO | WO-2006/049559 | A1 | 5/2006 |
| WO | WO-2012/094349 | A2 | 7/2012 |

OTHER PUBLICATIONS

Final Office Action mailed Nov. 15, 2013, for related U.S. Appl. No. 13/342,892, filed Jan. 3, 2013, 21 pages.

Final Office Action mailed Nov. 18, 2013, for related U.S. Appl. No. 13/342,884, filed Jan. 3, 2013, 19 pages.

Final Office Action mailed Nov. 18, 2013, for related U.S. Appl. No. 13/342,874, filed Jan. 3, 2012, 21 pages.

Final Office Action mailed Nov. 13, 2013, for related U.S. Appl. No. 13/342,914, filed Jan. 3, 2012, 30 pages.

Non-Final Office Action mailed Dec. 20, 2013, for related U.S. Appl. No. 13/342,908, filed Jan. 3, 2012, 28 pages.

International Search Report and The Written Opinion mailed Dec. 17, 2014, for Application No. PCT/US2014/059973 filed Sep. 10, 2014, 13 pages.

Liu, Dalian et al., "Motion Control of a Spherical Mobile Robot by Feedback Linearization," 7th WC on IC&A, Jun. 27, 2008, Chongqing, China, pp. 965-970. 6 pages.

Shu, Guanghui et al., "Motion Control of Spherical Robot Based on Conservation of Angular Momentum," IEEE Intl Conf on Mechatronics & Automation, Aug. 12, Changchun, China, pp. 599-604. 6 pages.

Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.

Harmo, Panu et al., "Moving Eye—Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.

Halme, Aarne, et al., "Motion Control of a Spherical Mobile Robot", Helsinki, IEEE AMC '1996, pp. 259-264. 6 pages.

Non-Final Office Action mailed Apr. 29, 2013, for related U.S. Appl. No. 13/342,874, filed Jan. 3, 2012, 47 pages.

Final Office Action mailed Jun. 6, 2014, for related U.S. Appl. No. 13/342,908, filed Jan. 3, 2012, 32 pages.

Provisional U.S. Appl. No. 61/362,005, Schmelzer, effective filing date Jul. 7, 2010, 10 pages.

Non-Final Office Action mailed Oct. 16, 2012, for related U.S. Appl. No. 13/342,853, filed Feb. 19, 2013, 10 pages.

Non-Final Office Action mailed Apr. 9, 2013, for related U.S. Appl. No. 13/342,892, filed Jan. 3, 2013, 19 pages.

Notification of Transmittal of International Search Report and The Written Opinion of The International Searching Authority mailed Dec. 3, 2012, for related PCT Application No. PCT/US2012/020115 filed Jan. 3, 2012, 11 pages.

Non-Final Office Action mailed Apr. 16, 2013, for related U.S. Appl. No. 13/342,884, filed Jan. 3, 2013, 20 pages.

Notice of Allowance mailed Apr. 19, 2013, for related U.S. Appl. No. 13/342,853, filed Feb. 19, 2013, 11 pages.

Non-Final Office Action mailed May 13, 2013, for related U.S. Appl. No. 13/342,874, filed Jan. 3, 2012, 17 pages.

Non-Final Office Action mailed Jun. 3, 2013, for related U.S. Appl. No. 13/342,914, filed Jan. 3, 2012, 41 pages.

Koshiyama et al., Machine Translation for JP 2000-218578, Aug. 8, 2000, 11 Pages.

Non-Final Office Action mailed Jun. 13, 2013, for related U.S. Appl. No. 13/342,908, filed Jan. 3, 2012, 36 pages.

European Search Report and European Search Opinion mailed Nov. 6, 2014, for related EP Application No. 12731945.7 filed Jul. 26, 2013. 7 pages.

Notification of Transmittal of International Search Report and The Written Opinion of The International Searching Authority mailed Aug. 28, 2013, for related PCT Application No. PCT/US2013/041023 filed May 14, 2013, 11 pages.

* cited by examiner

OPERATING A COMPUTING DEVICE BY DETECTING ROUNDED OBJECTS IN AN IMAGE

RELATED APPLICATION

This application claims priority under 35 U.S.C. §119(e) to Provisional Application No. 61/646,716, filed May 14, 2012, titled OPERATING A COMPUTING DEVICE BY DETECTING ROUNDED OBJECTS IN AN IMAGE, which is incorporated herein by reference in its entirety.

BACKGROUND OF THE INVENTION

With the improvement of mobile computing devices, users are able to use their devices for a variety of different purposes. Not only can a user operate a smartphone for making phone calls and for browsing the internet, for example, but a user can use his or her smartphone to perform a variety of different tasks.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein provide for a computing device that can detect one or more rounded objects (e.g., a ball, a self-propelled device having a spherical housing) in an image and track the detected rounded object(s). The computing device can utilize the detected rounded objects as input for performing one or more operations or processes on the computing device.

According to some embodiments, one or more images, including frames of real-time video, can be received from an image capturing device of the computing device. The computing device can operate one or more applications or operate in one or more modes that use the components of the image capturing device in order to receive visual input. The visual input can be of a scene and/or objects in the scene in which the lens of the image capturing device is focused on or pointed towards. For example, the scene can include an object of interest that is in motion and has a rounded shape.

Embodiments provide for the computing device to receive a plurality of images in order to detect one or more rounded objects (corresponding to one or more objects of interest) in one or more of the images. A rounded object that is depicted in an image, for example, can correspond to an object of interest having at least a housing or structure with a rounded shape or a partial rounded shape, such as an ellipse, oval, disc, sphere, etc. The object of interest can correspond to, for example, a ball, a circular object, a cylindrical object, or a self-propelled device having a spherical housing, etc., that is included within the scene (e.g., visual input detected by the image capturing device). In some examples, a self-propelled device can be modified (e.g., post assembly) to include a rounded or spherical aspect (e.g., attach a rounded object to the self-propelled device or drop a ping pong ball in a truck bed of a remote controlled truck). The computing device can process and utilize the detected objects in the images as input for performing one or more operations or processes on the computing device.

In some embodiments, each of the received images can be individually processed in order to detect one or more rounded objects. The computing device can use one or more detection techniques, together or individually, in order to detect the rounded object(s). According to one or more embodiments, the detection techniques can include using an image filter and a detection algorithm based on the size of the rounded object. In addition, the detection techniques can be used to determine the position information of one or more rounded objects based on a relative position of the one or more rounded objects in the one or more images. Detecting rounded object(s) in images can enable the computing device to track the movement of the rounded object(s), as well as the velocity and/or acceleration of the motion.

Upon detecting one or more rounded objects in the received images, the computing device can utilize the detected one or more rounded objects and the respective position information as input for performing additional operations or processes. In one embodiment, the computing device can adjust the images that include a detected rounded object, and present the adjusted images on a display device. In other embodiments, the computing device can use the detected rounded object as input for controlling the detected object (e.g., as a remote device).

According to one or more embodiments, the image capturing device can be distinct and separate from the computing device that detects the one or more rounded objects in the one or more images. The image capturing device and the computing device can wirelessly communicate with each other in order to enable the computing device to receive the one or more images from the image capturing device. A recording device, such as a video capturing device, can also be separate from and wirelessly communicate with the computing device. In other embodiments, the devices can be a part of or be incorporated together as one device.

Embodiments described herein also provide for the operations and/or processes that are performed by the recording device and/or the image capturing device and/or the computing device to be performed at different times and different orders (e.g., shifted temporally).

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
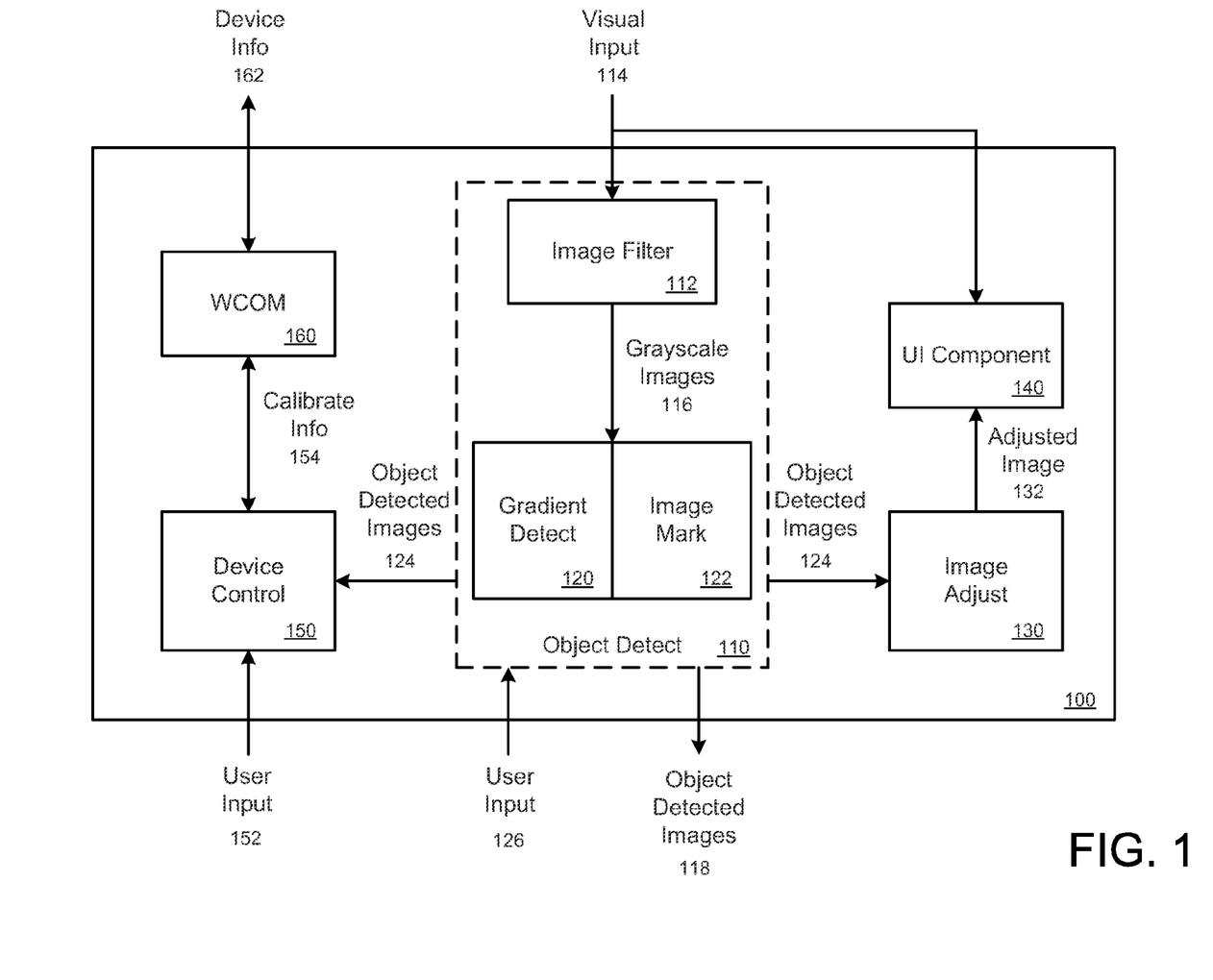
FIG. 1 illustrates an example system for operating a computing device, under an embodiment.

FIG. 1 illustrates an example system for operating a computing device, under an embodiment. A system such as described with respect to FIG. 1 can be implemented on, for example, a mobile multi-functional computing device (e.g., smart phone, tablet device) having an integrated image capturing component. In variations, system 100 can be implemented on notebooks, laptops, or other computing devices that can be operated in an environment where a camera is controlled or operated to track a moving object.

In an example of FIG. 1, system 100 operates to process image input in order to dynamically detect a rounded object, such as an object in motion. The detected rounded object can be part of a housing of a device that is under motion and/or under control of a computing device. According to some examples described, the rounded object is detected as part of a programmatic process in which the device that is integrated with the rounded object is controlled in movement or operation. In variations, the rounded object is detected in motion as part of a programmatic process in which the presence of the object is used to generate other programmatic processes, such as augmented reality that utilizes the rounded object in motion as input. Accordingly, system 100 can detect rounded objects that correspond to objects of interest that are in motion. The detection of such objects can provide input to enable the computing device to perform other operations, such as to control the object of interest, or to integrate a representation of the object of interest into an augmented reality that is displayed on the computing device.

Still further, system 100 can perform dimensional analysis of a plurality of images depicting a scene that includes an object of interest. Specifically, system 100 can perform dimensional analysis in order to determine the distance of the object of interest from the image capturing device and/or the computing device. For that purpose, in one example, rounded objects can be detected and processed in images efficiently by components of system 100.

In one embodiment, system 100 includes object detect 110, image adjust 130, user interface (UI) component 140, device control 150 and wireless communication (WCOM) 160. The components of system 100 combine to receive a plurality of images from an image capturing device and to automatically process the images to detect one or more rounded objects depicted in the images. Each image can be processed using one or more detection techniques so that the detected objects can be processed as input for performing one or more operations on the computing device.

According to an embodiment, the object detect 110 can also include sub-components, such as image filter 112, gradient detect 120, and image mark 122. These components can combine to enable the object detect 110 to detect and track one or more objects depicted in a plurality of images.

The computing device can operate one or more applications and/or operate in one or more different modes. In one embodiment, system 100 can be operated in response to a user executing or launching an application or program that uses visual input detected by an image capturing device to perform one or more processes (e.g., a game application or a device calibration settings program). The object detect 110 can receive a visual input 114, such as image input, from the image capturing device in order to detect one or more rounded objects in one or more images. For example, an image capturing device (e.g., an integrated camera) can receive and capture a scene (e.g., from whatever view and/or object(s) the lens is pointing at). The visual input 114 can be in the form of a sequence of images, or through video input (e.g., a plurality of images that are captured continuously at 30-60 frames per second).

In some embodiments, a preview of the images that are being received by the computing device can be provided on a display device of the computing device. For example, the visual input 114 can also be provided to the UI component 140 so that the UI component 140 generates the preview image of the received visual input 114 (as well as one or more features that can be presented with the preview image, e.g., zoom in or zoom out features, capture image feature). The display device (e.g., a touch-sensitive display device) can present a dynamically changing, real-time image of a scene in which the image capturing device is currently pointing at. This image can include one or more objects of interest in the scene, having a rounded characteristic (e.g., having a rounded housing or portion of the housing). A user can also capture and store one or more images of the scene by pressing down on a capture button or trigger, or by using another user interface feature (e.g., tap a "capture image" graphic feature provided on a touch-sensitive display).

According to some embodiments, the object detect 110 can individually process individual images to detect objects of interest. In particular, the objects of interest can be designated to match a particular shape, such as semi-sphere, or sphere (or other spherical portion). For each received image via the visual input 114, the object detect 110 can operate an image recognition software, and/or other image processing methods in order to detect the rounded, designated characteristic of the object of interest. For example, the object detect 110 can scan the pixels of the individually captured images to detect rounded objects corresponding to spheres, semi-spheres or other variations (depending on the designated rounded characteristics).

The object detect 110 can use different detection techniques, together or individually, in order to detect one or more rounded objects in individual images. In one embodiment, the image filter 112 of the object detect 110 can receive one or more images and apply a filter, such as a grayscale filter, to each of the received images. Applying a grayscale filter to the image can convert each pixel of the image to a shade of gray (e.g., based on intensity information). The image filter 112 can provide a grayscale image 116 of each received image to the gradient detect 120 and the image mark 122. Once in grayscale, a trained object detector can scan the grayscale pixels for rounded objects that potentially correspond to the object of interest. The use of the grayscale filter promotes fast image object detection to enable real-time detection of an object of interest when that object is in motion.

In some embodiments, the objects of interest can include additional characteristics to facilitate their respective tracking. For example, the rounded characteristic of the object of interest can further be combined with additional features, such as other structural visual landmarks, brightness in color (e.g., white, silver, yellow, etc.), illuminations, or surface patterns. By way of example, the object of interest can be brightly colored (e.g., white), and the use of a grayscale filter on the processed input images can yield objects which can have a lighter shade of gray than other pixels for other portions of the same scene. In one embodiment, the grayscale images 116 can be provided to the gradient detect 120 and the image mark 122, which use one or more image processing methods (e.g., apply one or more algorithms), to detect the rounded object(s) in each grayscale image 116.

Still further, in variations, known (or pre-determined) information about the objects of interest can be used in performing object detection. For example, a user can provide inputs 126 that correspond to visual markers for the object of interest. Such inputs 126 can include, for example, the estimated size (e.g., a radius or diameter) of the rounded object(s) as well as the color(s) of the object(s) via an input mechanism (e.g., using one or more buttons, or a touch-sensitive display screen). In another variation, the user can provide input 126 corresponding to a circular gesture on the touch-sensitive display in order to indicate an approximate size of the object as presented on the display. In other examples, information about the one or more rounded objects can be stored in a memory of the computing device. The gradient detect 120 can use known information in order to detect the rounded object(s) in each of the images.

In one embodiment, the gradient detect 120 can process individual pixels (or some pixels) of the grayscale images 116 in order to determine a respective gradient for the individual pixels. The gradient for particular pixel can be based on surrounding pixels, including immediately adjacent pixels. A gradient corresponds to a vector having a direction in which the brightness level of pixels in that direction increases. For example, the brightness level of a pixel is lower or less bright than the brightness level of other pixels in the direction of the gradient. The image mark 122 implements logic that marks, for the determined gradient of each pixel, a point in the direction of the gradient that is within the distance equal to a radii (e.g., actual radius, radius of curvature) of the rounded object(s). For example, the user can indicate (via a user input 126) that the rounded object to be detected has a radius of a certain size or approximate pixel length. For example, the approximated pixel length can be set to twenty pixels. In other examples, the approximated pixel length can be assumed or predetermined based on previously stored information about the size of the rounded object in the image. Using the determined gradient, for each pixel, the image mark 122 can mark a point within the twenty pixel length of that particular pixel in the direction of the gradient that has the highest brightness level. This can represent a center or middle of the rounded object. Based on the plurality of markings (e.g., a marking for each pixel of the grayscale image 116), the object detect 110 can assume that a region of the image having a plurality of markings corresponds to the center of the rounded object and can determine the location or position of the rounded object(s) in each grayscale image 116 (if any exists). The determined position information of the rounded object can be relative to the image.

The gradient detect 120 can also access parameters (that can be stored in a database or list in a memory resource of the computing device) in determining the gradient for each pixel in the grayscale image 116. A parameter, for example, can include a brightness threshold and a gradient threshold. The brightness threshold can instruct the gradient detect 120 to ignore computing a gradient for a particular pixel if adjacent pixels (pixels in a direction moving away from the particular pixel within a radius distance of that particular pixel), do not show a pattern of increasing in brightness. In another example, a gradient threshold can instruct the gradient detect 120 to ignore computing a gradient for a particular pixel if adjacent pixels do not show a strong enough change in brightness levels in a direction moving away from the particular pixel. For pixels where gradients are not computed, no markings would be provided by the image mark 122.

In another embodiment, the object detect 110 can apply different radii of a rounded object in order to detect the rounded object in the grayscale images 116. Because the gradient detect 120 and the image mark 122 can process each individual pixel in a grayscale image 116, the object detect 110 assumes that the radii used to detect the rounded object can vary from one region of the image to another, for each grayscale image 116. Due to the angle, the orientation, the distance, and the positioning of the image capturing device in relation to the rounded object(s), a rounded object(s) can vary in size depending on how close it is to the user. The object detect 110 can receive information about the orientation and the positioning of the image capturing device (e.g., where the lens of the image capturing device is pointed at or focused on) to determine whether a given pixel in an image represents the ground or floor that is closer to the user or user's feet, or whether the pixel represents a point that is further away from the user (e.g., closer to the horizon). The object detect 110 further assumes that if a particular point in the image represents a region that is closer to the user, then the rounded object at or near that point would typically be larger in the image than if the rounded object was further away from the user. As a result, for a point that represents a region closer to the user, the image mark 122 can apply a larger radius when marking a region in the direction of the gradient of that point (as the rounded ball to be detected is assumed to be larger in the image).

For a point that represents a region that is further away from the user, the rounded object at or near that point would typically appear to be smaller in the image. As a result, after determining that the given point represents a region further away from the user, the image mark 122 can apply a smaller radius when marking a region in the direction of the gradient for that point (e.g., ten pixel lengths instead of twenty pixel lengths). In this manner, the object detect 110 can also determine whether the rounded object is moving in one or more directions, as the rounded object can become larger in size from one image to another in a sequence of images (e.g., if it is moving closer to the user) or become smaller in size from one image to another (e.g., if it is moving further away from the user).

For example, based on the accelerometer and/or other sensing mechanisms of the computing device, the computing device can detect its position relative to the ground. In addition, the computing device can determine the ground plane and horizon of the image(s) being provided by the image capturing device. Based on the determined information, if the user is holding the computing device in a way so that the lens of the image capturing device is pointing to an area that is closer to her, for example, the computing device can increase the radius (e.g., size) of rounded objects that are being detected. On the other hand, if the user is holding the computing in a way so that the lens of the image capturing device is pointing to an area that is further away from the user (e.g., a further distance away proximity), the radius of rounded objects that are being detected can be decreased.

As discussed, for each determined gradient (for each pixel), the image mark 122 can mark a point (e.g., a location in or with the image) in the direction of the gradient that is within the distance equal to the radius of the rounded object(s). In this manner, instead of the user indicating that the rounded object to be detected has a certain radius, the image mark 122 can mark a point within a varying radius in the direction of the gradient that has the highest brightness level. The radius can be varied depending on whether the lens of the image capturing device of the computing device is pointing to an area that is closer to or further from the user.

In some embodiments, the estimated size of the one or more rounded objects can be automatically configured and/or stored in a memory resource of the computing device. For example, a rounded object can be a self-propelled device having a rounded housing (e.g., a spherical housing) that is paired or wirelessly connected with the user's computing device. Information about the user's self-propelled device can be stored in the memory resource of the computing device.

The object detect 110 can also apply different types of filters depending on the user input 126. In some embodiments, the image filter 112 can apply other types of filters depending on the color(s) of the rounded object(s) of interest that is being detected by the object detect 110. If the rounded object of interest is dark in color, for example, the user can provide an input 126 that indicates the color of the ball.

The object detect 110 can detect one or more rounded objects in one or more images and also provide information corresponding to the detected objects. Information about the detected objects can include the color of the object, the size, the shape (e.g., ellipse or sphere), the position of the object relative to the image, etc. In one embodiment, the information about the detected rounded object(s) can be stored in a memory resource of the computing device.

According to one or more embodiments, system 100 utilizes the detected one or more objects from the image(s) (including the position information of the one or more objects) as input for performing one or more operations or processes on the computing device. In the example system of FIG. 1, the object detect 110 can provide information about the detected object and the images (e.g., object detected images 124) to the image adjust 130 and the device control 150. For example, the image adjust 130 can operate as part of or in conjunction with a gaming application.

In some embodiments, system 100 can determine that a rounded object of interest is moving based on the object detected images 124. For example, two or more images corresponding to different instances in time (e.g., in sequence) can include a rounded object corresponding to the object of interest in the scene. In the first image of two or more images, the rounded object can be detected at a first position relative to that image. In the next image in the sequence, the rounded object can be detected at a second position relative to that image. As a result of the change in position of the detected rounded object in different images, the device control 150 and/or the image adjust 130 can determine that the rounded object is in motion (or has moved). In other examples, the rounded object of interest can be at a stationary position, but be rotating in place. The rotating rounded object can be detected in the image(s).

Still further, the rounded object detected from image input can be translated into a coordinate data for a given reference frame relevant to the image depiction. This coordinate reference frame can be translated into a real-world coordinate system in order to observe and/or predict position related information about the object of interest. The position of the object of interest can thus be mapped from an image depiction of the object, given that the depth of the object from the image capturing device can be determined from dimensional analysis of the object's depiction. In addition to position information, the velocity of the object of interest can be determined from the reference frame of the image depiction of the object, as mapped to the determined reference frame of the real-world object of interest.

In another example, the object of interest having a rounded characteristic can be placed on top of an object with a known height instead of on the ground or floor (e.g., on top of a coffee table or on top of a remote controlled toy truck). Using the known (or pre-determined) information about the object of interest and the known height, the object detect 110 can determine a more accurate position of the object in the image(s). In addition, based on the information (such as the known information and height) and the reference frames, the image adjust 130 can provide images that are to be rendered on a display device that are dimensionally accurate (with respect to the actual location of the object of interest and the position of the image capturing device).

For example, the image adjust 130 can process the object detected images 124 in order to dynamically adjust at least a portion of an image. The image adjust 130 can also access a set of rules for mapping the coordinate reference frame and the real-world coordinate system so that the rendered adjusted images can be dimensionally accurate with respect to the real-world scene. The rules can correspond to real world parameters. In some example, the real world parameters can be altered, e.g., by user input, if a dimensionally accurate rendition is not desired.

The image adjust 130 can also store the adjusted image 132 in a memory resource of the computing device. This enables a user to access the memory resource in order to view any of the stored adjusted images 132 at a later time. In other embodiments, system 100 can enable additional processing of the images for performing other operations. The image adjust 130, for example, can access the previously processed images and perform additional adjustments to the images. In some variations, the processes performed by the object detect 110 and/or image adjust 130 can be performed on images that are stored, rather than "live" or in real-time. Thus, for example, the processes described with the object detect 110 and the image adjust 130 can optionally be temporally shifted with respect to when the images are captured and/or stored.

In other examples, the image adjust 130 can dynamically overlay or replace the detected rounded object in the image with a graphic image (e.g., a character, an animal, some other object other than a ball) or after the image of the detected rounded object itself (e.g., change the color of the rounded object, or distort the rounded object) in real-time. The adjusted image 132 can be provided to the UI component 140 so that the user of the computing device can see on a display device, rendered content that includes the adjusted detected object. The UI component 140 can also generate one or more features that can be presented on the display device of the computing device. As described, in some examples, the adjusted content that is rendered can be dimensionally accurate with respect to the position of the actually object of interest and the position of the image capturing device.

For example, the user can watch a live sporting event (e.g., kids playing soccer at a park) and point the lens of her computing device at the field. The visual input 114 received can include a plurality of frames of images detected by the image capturing device. The object detect 110 can detect the rounded object (corresponding to the object of interest, e.g., the soccer ball) in each of the sequence of images (e.g., the position of the ball can be different in each image because the ball is in motion). The image adjust 130 can process the detected object (e.g., the detected soccer ball) by highlighting the ball or providing a ring around the ball and providing the images to the UI component 140. The user is then able to see the adjusted images 132 (with any additional features) on the display device of the computing device.

In other embodiments, the device control 150 can process the object detected images 124 in order to provide one or more controls for a remote device. For example, the detected rounded object can be a self-propelled device that is paired or wirelessly connected with the user's computing device. The user can see the representations of the received visual input 114 that includes the detected rounded object (e.g., the user's self-propelled device) on the display device of the computing device. The user can then interact with the displayed representation of the self-propelled device on the touch-sensitive display screen by providing user input 152 (e.g., touch input on the touch-sensitive display screen) to the device control 150.

The device control 150 receives object detected images 124 and the user input 152 to determine what types of control information to generate 154. Based on the received information corresponding to the detected rounded object via object detected images 124, the control information 154 can be determined by detecting the user input 152 on a particular location of the display screen, for example, and determining that the location corresponds to the detected rounded object on the image. For example, the user can tap on the displayed representation of the self-propelled device to cause it to spin, for example, or tap and drag his or her finger in a direction to cause the self-propelled device to move accordingly. The control information 154 is provided on the WCOM 160 so that the information can be provided to a remote device.

For example, the device control 150 determines the position of the detected rounded object in the object detected image(s) 124 (e.g., the position of the detected rounded object relative to the image). When the user provides an input or performs a gesture on the representation of the self-propelled device (e.g., drags the representation to the right on the touch-sensitive display), the device control 150 can determine the path of the gesture, relative to a reference (e.g., the original position of the displayed representation of the self-propelled device), and translate the gesture to control signals for moving the self-propelled device in a similar manner. The control signals can be provided to the self-propelled device to cause the self-propelled device to move accordingly.

The WCOM 160 serves to exchange data between system 100 and other external devices (e.g., such as a remote device or the user's self-propelled device). In one embodiment, WCOM 160 can implement a variety of different protocols, such as a BLUETOOTH communications protocol, a Wi-Fi communications protocol, infrared communications protocol, etc. The control information 154 can be wireless communicated to the remote device (e.g., the self-propelled device, for example) to cause the self-propelled device to perform a designated action corresponding to the user command.

In some embodiments, the device control 150 can provide control information 154 for calibrating one or more components of the remote device (or for calibrating one or more components of the computing device). For example, the rounded object of interest (e.g., the user's self-propelled device) can have one or more gyroscopes. Over time, the gyroscope may need recalibration due to gyroscope drift. By using the object detected images 124, the device control 150 can detect whether the self-propelled device is moving, for example, or whether it is stationary, and provide control information 154 (that includes calibration information) to be transmitted to the self-propelled device via WCOM 160. Based on detecting the line of movement of the self-propelled device and the object detected images 124, the device control 150 can calibrate the gyroscope of the self-propelled device. In one embodiment, the device control 150 can also receive device information 162 from the self-propelled device that includes current information about the components of the self-propelled device (including real-time information about the gyroscope). The device control 150 can use this information for calibrating the gyroscope of the self-propelled device. In this manner, system 100 can be used to eliminate gyroscope drift.

Similarly, the one or more gyroscopes of the computing device can also be calibrated using the detected rounded object. For example, when the rounded object is determined to be still or stationary, the device control 150 can calibrate the gyroscope of the computing device by using the detected rounded object as a reference point.

The object detect 110 can also provide object detected images 118 to other components or systems of the computing device and/or to remote devices (not shown in FIG. 1) for additional processing. Other components can process the detected rounded objects as inputs for performing other operations.

According to one or more embodiments, the visual input 114 received by system 100 can also be provided from an image capturing device that is remote from the computing device. For example, the image capturing device can be separate from the computing device. The image capturing device can detect and/or capture scenes and transmit the visual input 114 to the computing device (e.g., using a wire or wirelessly). System 100 can receive the visual input 114 via the WCOM 160, for example, when the visual input 114 is received wirelessly from the image capturing device. System 100 can then detect one or more rounded objects from the images received from the remote image capturing device and perform additional operations based on the processed detected objects.

In another embodiment, system 100 can receive the images (e.g., frames from real-time video) and then process the images (e.g., detect one or more rounded objects and/or adjust the images) after a duration of time. For example, the visual input 114 provided by the image capturing device can first be stored in a memory resource of the computing device before the object detect 110 retrieves or receives the visual input 114 for processing. The object detect 110 can perform the processing in response to a user input 126 (thereby causing the visual input 114 to be retrieved or received by the object detect 110 from the memory resource). In other embodiments, system 100 can perform additional processing even after the images are dynamically processed. For example, after the image adjust 130 processes the object detected images 124 the first time, at a later time, the image adjust 130 can perform additional processing to provide different adjusted images 132 to the UI component 140. In this manner, a user can view different adjusted images 132 (e.g., an adjusted image with different graphic image overlays) at different times.

In some embodiments, some of the components that are described in system 100 can be provided as being individual components or as being part of the same component. For example, the object detect 110 and the image adjust 130 can be provided as part of the same component. In another example, the object detect 110 and the device control 150 can be provided as part of the same component. In other embodiments, the components that are described in system 100 can be provided as part of the device operating system or as part of one of more applications (e.g., as part of a camera application, a remote device controlling application, or a gaming application). Logic can be implemented with a camera application (e.g., software) and/or with hardware of the image capturing device.

In some examples, the object of interest can alternatively have other predefined shapes that can be subject to dimensional and image analysis in order to detect objects in one or more images. For example, system 100 can utilize other object detection and/or image processing techniques to detect objects having shapes other than a rounded shape, such as a classifier that is trained for detecting an object with a particular two-dimensional shape (e.g., having a rectangular shape or triangular shape). The object detect 110 can detect other predefined shapes to translate dimensional information about an image of that object into spatial and/or positional information in the real-world.

As an addition or alternative, examples described herein can also be used for adjacent object analysis. In adjacent object analysis, position information about an object that is adjacent to the object of interest can be determined based on its known spatial relationship with the object of interest. For example, the object of interest can be a tank vehicle, where the position of the tank vehicle can be determined in the image(s). The gun that the tank vehicle is equipped with can also be tracked using adjacent object analysis.

Still further, multiple objects of interest (e.g., having a rounded or spherical shape) can be simultaneously tracked in one or more images of a given scene. The objects of interest can be in motion or be stationary. The object detect 110 can detect multiple objects of interest along with the position information for each tracked object. The position of each tracked object relative to other tracked objects can be used to determine other objects or points of interest that may be intermediate to the objects of interest. For example, multiple spherical objects can be detected and tracked in images to determine a point cloud for purpose of determining the position of other objects that may be near one or more of the tracked objects.

Methodology

Figure 2:
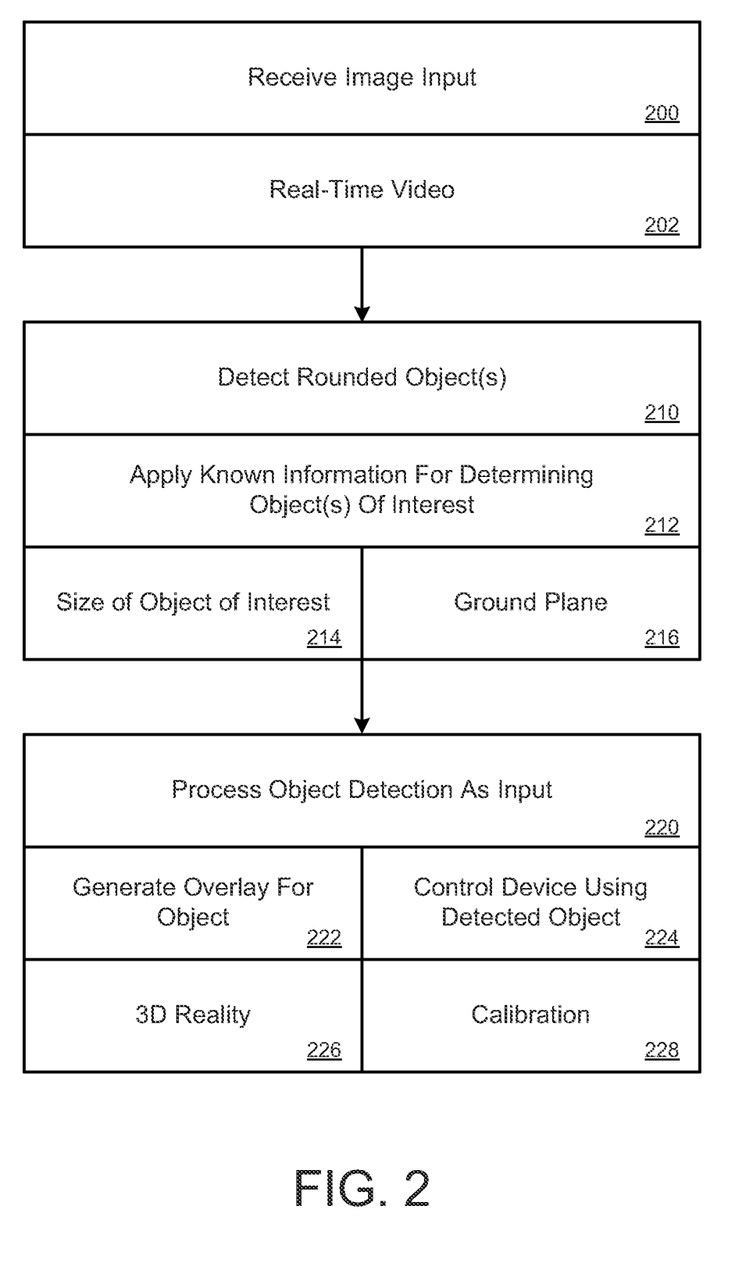
FIG. 2 illustrates an example method for operating a computing device, according to an embodiment.

FIG. 2 illustrates an example method for operating a computing device, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

The computing device can receive a plurality of images from its image capturing device (step 200). The plurality of images can correspond to visual input of a scene that the lens of the image capturing device is pointing at or focused on. In some embodiments, the image input can correspond to real-time video that is provided by the image capturing device (sub-step 202). Real-time video can include a number of frames (where each frame can be an image) that are detected and/or captured per second (e.g., 30 frames per second).

Each of the images can be individually processed to detect one or more rounded objects in the images (step 210). The computing device can operate an image recognition software and/or other image processing methods in order to detect the rounded object(s) in each image. A rounded object in an image can correspond to an object of interest that is present in the scene and having a rounded housing characteristic. In one embodiment, the rounded object(s) can be detected by applying known information for determining object(s) of interest (sub-step 212). The known information can be provided by a user or can be preconfigured and/or stored in a memory resource of the computing device.

According to one or more embodiments, the known information can include the size of the rounded object(s) of interest (sub-step 214). The size of the rounded object(s) can correspond to the radius (or radii for ellipses, for example) of the object or the diameter of the object, or in some cases, the relative size as compared to the screen size of the display device. The one or more rounded objects can be detected in each of the images by using size information about the rounded object(s), such as a radius or diameter of a rounded object (e.g., in pixel lengths). In addition, known information can include information corresponding to the positioning of the computing device with respect to the ground plane (sub-step 216). Based on the orientation, direction, and position in which the user is pointing the lens of the computing device, the rounded object(s) can be determined as being smaller in size (relative to the screen size) or larger in size. In such cases, the radius or diameter of the rounded object can dynamically vary in size. A rounded object can be detected in each image, for example, by applying a grayscale filter, such as discussed in FIG. 1. In addition, information of the rounded object, such as the position information of the rounded object relative to the image, can also be determined.

By detecting one or more rounded objects in the images, the computing device can utilize the detected object(s) and the position information of the detected object(s) as input for performing one or more operations or processes on the computing device (step 220). For example, the computing device can adjust the images, for display on a display device, by generating an overlay or by replacing the detected rounded object(s) in the image with a graphic feature that mimics the movement of the rounded object(s) in the images (sub-step 222). Such graphical adjustments can be useful for gaming applications that use real world scenarios as part of the game.

In one embodiment, the overlay can also be a graphic feature having three-dimensional characteristics. The graphic feature can be rendered as part of the displayed images so that it is consistent with the three-dimensionality and movement of the detected rounded object. For example, if the rounded object rotates in 180 degrees, the overlaid graphic feature can also rotate in a similar feature.

The computing device can also process the detected object(s) as input for wirelessly controlling the detected rounded object(s) (e.g., the self-propelled device) (sub-step 224). For example, the user can manipulate the image containing the representation of the self-propelled device on the display device in order to control the actual self-propelled device (e.g., the object of interest) to move in a certain direction with a certain speed. The user can also tap a target location on the touch-sensitive display screen in order to cause the self-propelled device to move to the target location. In another embodiment, the detected rounded object(s) can be used as input for projecting or displaying images based on real life objects in the vicinity of the user and the real life rounded object (sub-step 226). The detected rounded object(s) can also be used for calibrating one or more components of the detected rounded object (sub-step 228).

Other applications of processing the detected object(s) as input may include tracking balls in ball sports, or using balls and/or circular discs as being markers or fixed reference points (e.g., fiducial markers). The discs, for example, can be used as a reference point or measurement point for placing other objects in the image(s). In addition, other applications include using the detected object(s) for spatial mapping or navigation. Points, object positions, navigation way-points, etc. can all be given virtual locations which correspond with concrete locations over a long period of time. The computing device can provide information about the location and position of the detected rounded object to the rounded object so that the rounded object (e.g., self-propelled device) can measure its own progress toward target locations and navigate itself to locations. In other applications, based on the detected rounded object(s), absolute positions of objects of known height can be calculated by selecting (e.g., tapping on the display screen) the objects' locations from the image(s).

Figure 3A:
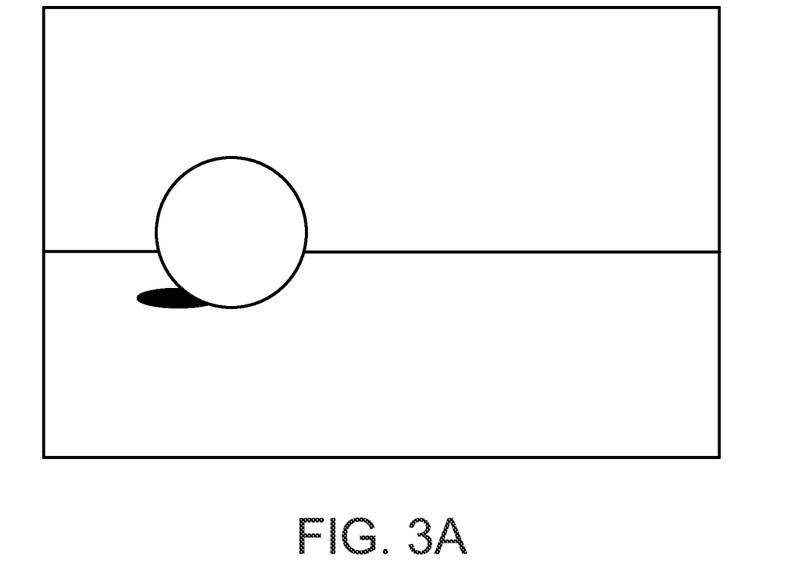
FIGS. 3A-3B illustrate an example of a processed image, under an embodiment.
Figure 3B:
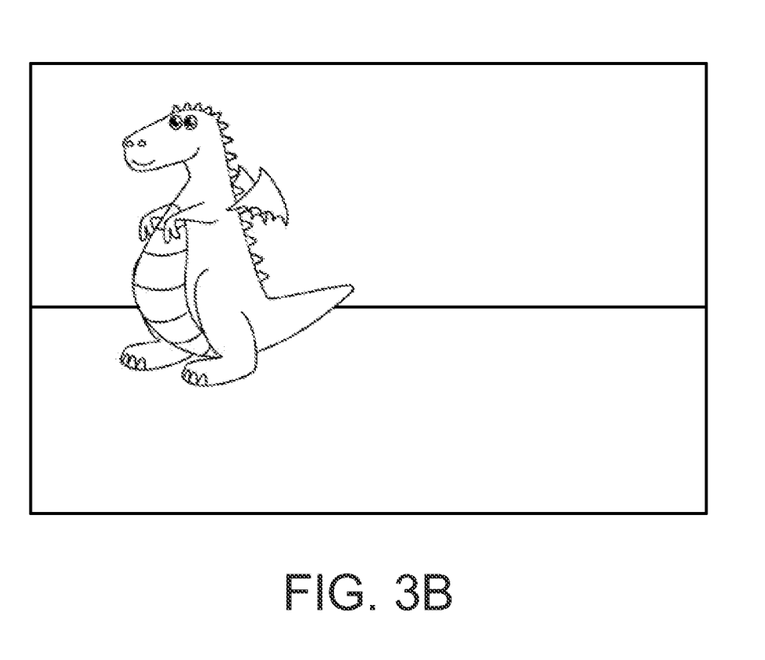

FIGS. 3A-3B illustrate an example of a processed image, under an embodiment. The example user interface features provided on a display device, such as described by an embodiment of FIGS. 3A-3B, can be implemented using, for example, components described with an embodiment of FIG. 1. Accordingly, references made to elements of FIG. 1 are for purposes of illustrating a suitable element or component for performing a step or sub-step being described.

FIG. 3A illustrates an image of a scene that includes a representation of a rounded or spherical object (e.g., a ball). The rounded object can be in motion. However, because FIG. 3A illustrates a single image of a sequences of images, for example, the rounded object is depicted as being stationary. The computing device can provide such an image on a display device as part of a preview of what is being detected and/or captured by the image capturing device of the computing device.

After the computing device detects the rounded object and the location or position of the rounded object in the plurality of images, the detected rounded object can be utilized as input for performing one or more additional operations. In one embodiment, the image(s) can be adjusted by visually altering the detected rounded object. For example, the user can operate the computing device in order to play a game (e.g., operate a gaming application). In FIG. 3B, the image including the detected rounded object can be adjusted by overlaying or replacing the detected rounded object with another graphic image (e.g., a dragon) as part of the game. As the spherical object moves in real time and in the real world, the sequence of images being received also depicts the ball as moving.

Each of the images can be processed to detect the spherical object, and the detected spherical object can be processed as input so that, on the display device of the computing device, the displayed dragon also moves accordingly. In some variations, the images being rendered can be dynamically adjusted. For example, the graphic image of the dragon can be dynamically changed to a graphic image of a lizard in response to a trigger, such as a user input or the object of interest being moved to a particular location or next to another object of interest.

As an addition or alternative, a computing device, such as a device that implements system 100 of FIG. 1, can detect multiple rounded objects in images and track the positions and/or movements of the multiple rounded objects, while another computing device controls the object of interests. In some embodiments, an image capturing device and/or the computing device that processes the images to detect one or more rounded objects can be separate and distinct from a computing device that controls the movement of the object of interest, such as a rounded or spherical self-propelled device. Still further, in one variation, content (e.g., a graphic overlay) that is rendered based on the detected and tracked object on a computing device can be dynamically altered based on one or more triggers or inputs provided by another computing device.

For example, multiple users can engage with one another in a gaming environment, where a first user controls the movement of the object of interest using a first computing device, while a second user and a third user track the object of interest and render content on their respective computing devices. A fourth user can use a fourth computing device to control what content is being displayed on the second and third users' devices (e.g., dynamically adjust what graphic image is displayed in place of the detected object). For example, in one implementation, the second user can track the object of interest and view rendered content that is different than content that is rendered on a computing device of the third user (e.g., based on the fourth user controlling what content is to be displayed to individual users). The computing devices can communicate with each other via a wireless communication protocol, such as Bluetooth or Wi-Fi.

In another usage example, multiple users with respective computing devices can detect and track ten objects of interest, including one or more self-propelled devices. Control over one or more objects of interest can be passed between the users.

Hardware Diagram

Figure 4:
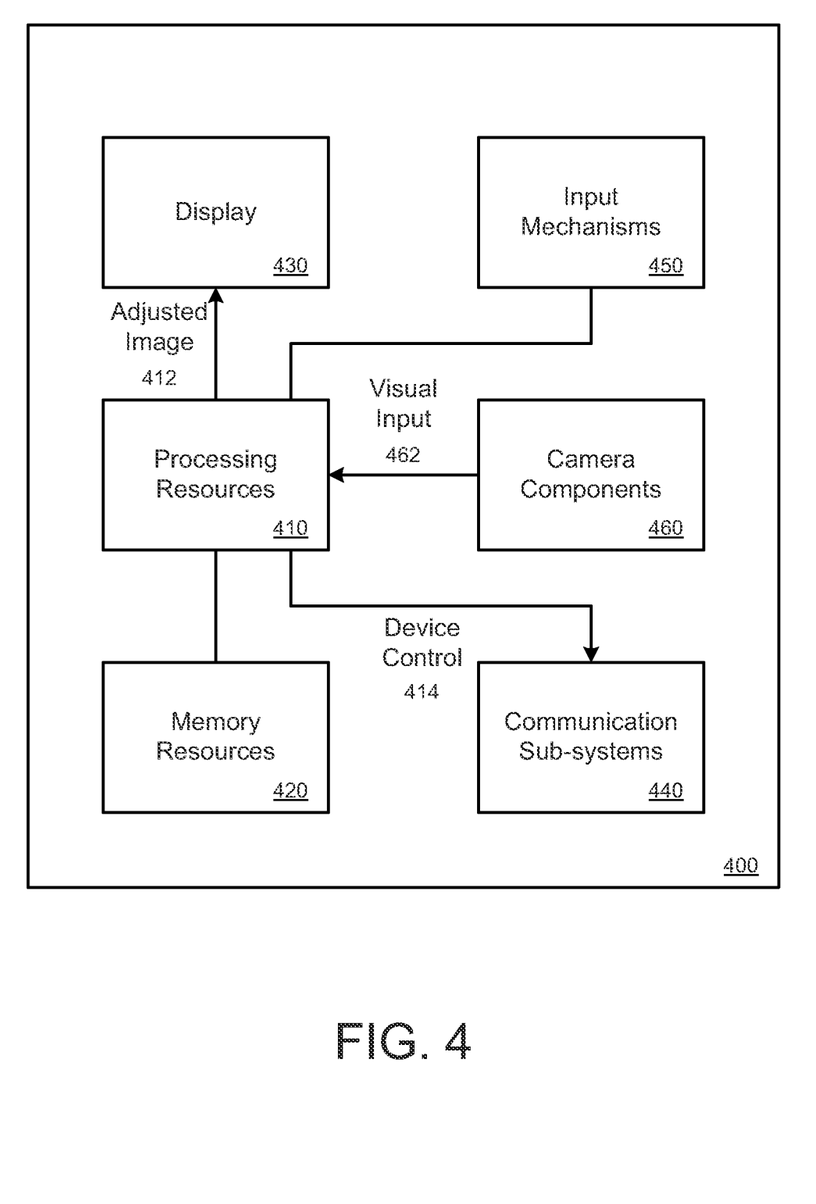
FIG. 4 illustrates an example hardware diagram for a system for operating a computing device, under an embodiment.

FIG. 4 illustrates an example hardware diagram of a computer system upon which embodiments described herein may be implemented. For example, in the context of FIG. 1, the system 100 may be implemented using a computer system such as described by FIG. 4. In one embodiment, a computing device 400 may correspond to a mobile computing device, such as a cellular device that is capable of telephony, messaging, and data services. Examples of such devices include smart phones, handsets or tablet devices for cellular carriers, digital cameras, or laptops and desktops (e.g., PC). Computing device 400 includes processing resources (e.g., one or more processors) 410, memory resources 420, a display device 430, one or more communication sub-systems 440 (including wireless communication sub-systems), input mechanisms 450, and camera components 460. The display device 430 can be a touch-sensitive display device that can also receive input from a user. In one embodiment, at least one of the communication sub-systems 440 sends and receives cellular data over data channels and voice channels.

The processing resources 410 are configured with software and/or other logic to perform one or more processes, steps and other functions described with embodiments, such as described by FIGS. 1-3, and elsewhere in the application. The processing resources 410 are configured, with instructions and data stored in the memory resources 420, to implement the system 100 (as described with FIG. 1). For example, instructions for implementing the object detect (including the image filter, the gradient detect, the image mark), the image adjust, the UI component, and the device control can be stored in the memory resources 420 of the computing device 400.

The processing resources 410 can execute instructions for operating the object detect and for receiving images (via visual input 462) that have been captured by the lens and/or other components 460 of the image capturing device. After detecting one or more rounded objects in the one or more images, the processing resources 410 can execute instructions for causing adjusted images 412 to be presented on the display device 430. The processing resources 410 can also execute instructions to provide device controls 414 for a remote device via the communication sub-systems 440.

In some embodiments, the processing resources 410 can execute and operate a variety of different applications and/or functionalities, such as, for example, a home page or start screen, an application launcher page, messaging applications (e.g., SMS messaging application, e-mail application, IM application), a phone application, game applications, calendar application, document application, web browser application, clock application, camera application, media viewing application (e.g., for videos, images, audio), social media applications, financial applications, and device settings.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating a computing device, the method being performed by one or more processors and comprising:
processing one or more images of a scene captured by an image capturing device of the computing device, the scene including a self-propelled device that is in motion and can be controlled wirelessly by the computing device, the self-propelled device having a characteristic rounded shape;
detecting the self-propelled device in the one or more images;
determining position information based on a relative position of the self-propelled device in the one or more images; and
implementing one or more processes that utilize the position information determined from the relative position of the self-propelled device;
wherein implementing the one or more processes includes (i) determining a reference point for the self-propelled device, (ii) enabling a user to interact with a displayed representation of the self-propelled device on a touch-sensitive display of the computing device, and (iii) controlling a movement of the self-propelled device based on the reference point.

2. The method of claim 1, wherein implementing the one or more processes further includes displaying, on the touch-sensitive display of the computing device, the displayed representation of the self-propelled device based on the determined position information.

3. The method of claim 1, wherein the self-propelled device is spherical.

4. The method of claim 1, wherein detecting the self-propelled device includes applying a filter to each of the one or more images.

5. The method of claim 4, wherein the filter is a grayscale filter, and wherein applying the filter includes generating a grayscale image for each of the one or more images.

6. The method of claim 5, wherein detecting the self-propelled device further includes determining a brightness gradient for a number of pixels in each of the one or more grayscale images, the brightness gradient indicating a center of the self-propelled device in the one or more grayscale images.

7. The method of claim 6, wherein detecting the self-propelled device includes, for each respective one of the pixels, marking a number of points within a defined distance of the respective pixel in a direction from the center of the self-propelled device, and determining the relative position of the self-propelled device in the one or more grayscale images based on the marked points.

8. The method of claim 1, wherein implementing the one or more processes further includes adjusting at least a portion of the one or more images in which the self-propelled device is detected.

9. The method of claim 8, wherein adjusting at least a portion of the one or more images includes generating a graphic feature to overlay the self-propelled device.

10. The method of claim 1, wherein implementing the one or more processes further includes calibrating one or more components of the self-propelled device.

11. A non-transitory computer-readable medium storing instructions that, when executed by a processor of a computing device, causes the processor to:
process one or more images of a scene captured by an image capturing device of the computing device, the scene including a self-propelled device that is in motion and can be controlled wirelessly by the computing device, the self-propelled device having a characteristic rounded shape;
detect the self-propelled device in the one or more images;
determine position information based on a relative position of the self-propelled device in the one or more images; and
implement one or more processes that utilize the position information determined from the relative position of the self-propelled device;
wherein the executed instructions cause the processor to implement the one or more processes by (i) determining a reference point for the self-propelled device, (ii) enabling a user to interact with a displayed representation of the self-propelled device on a touch-sensitive display of the computing device, and (iii) controlling a movement of the self-propelled device based on the reference point.

12. The non-transitory computer-readable medium of claim 11, wherein the executed instructions cause the processor to detect the self-propelled device by applying a grayscale filter to each of the one or more images, and wherein the executed instructions cause the processor to generate a grayscale image for each of the one or more images.

13. The non-transitory computer-readable medium of claim 12, wherein the executed instructions cause the processor to detect the self-propelled device by determining a brightness gradient for a number of pixels in each of the one or more grayscale images, the brightness gradient indicating a center of the self-propelled device in the one or more grayscale images.

14. The non-transitory computer-readable medium of claim 13, wherein the executed instructions cause the processor to detect the self-propelled device by, for each respective one of the pixels, marking a number of points within a defined distance of the respective pixel in a direction from the center of the self-propelled device, and by determining a position of the self-propelled device in the one or more grayscale images based on the marked points.

15. The non-transitory computer-readable medium of claim 14, wherein the executed instructions further cause the processor to implement the one or more processes by calibrating one or more components of the self-propelled device.

16. A mobile computing device comprising:
a touch-sensitive display;
an image capturing device;
a memory; and
a processor coupled to the image capturing device and the memory, the processor to:
process one or more images of a scene captured by the image capturing device, the scene including a self-propelled device that is in motion and can be controlled wirelessly by the mobile computing device, the self-propelled device having a characteristic rounded shape;
detect the self-propelled device in the one or more images;
determine position information based on a relative position of the self-propelled device in the one or more images; and
implement one or more processes that utilize the position information determined from the relative position of the self-propelled device;
wherein the executed instructions cause the processor to implement the one or more processes by (i) determining a reference point for the self-propelled device, (ii) enabling a user to interact with a displayed representation of the self-propelled device on the touch-sensitive display, and (iii) controlling a movement of the self-propelled device based on the reference point.

* * * * *